US006938315B2

(12) United States Patent
Alanis

(10) Patent No.: US 6,938,315 B2
(45) Date of Patent: Sep. 6, 2005

(54) TOOL FOR FACILITATING THE REMOVAL AND REPLACEMENT OF ENGINE VALVE STEM SPRINGS AND SEALS

(76) Inventor: Fransisco Alanis, P.O. Box 1944, Roma, TX (US) 78584

( * ) Notice: Subject to any disclaimer, the term of this patent is extended or adjusted under 35 U.S.C. 154(b) by 143 days.

(21) Appl. No.: 10/684,234

(22) Filed: Oct. 10, 2003

(65) Prior Publication Data

US 2005/0076486 A1 Apr. 14, 2005

(51) Int. Cl.[7] .................................................. B23P 19/04
(52) U.S. Cl. ............................................ 29/216; 29/217
(58) Field of Search .......................... 29/215, 216, 217, 29/218

(56) References Cited

U.S. PATENT DOCUMENTS

| | | | | |
|---|---|---|---|---|
| 2,213,102 A | * | 8/1940 | Crook et al. | 29/216 |
| 2,301,862 A | * | 11/1942 | Fahey | 29/216 |
| 3,977,064 A | | 8/1976 | Mote et al. | |
| 3,979,811 A | | 9/1976 | Kammeraad | |
| 3,984,909 A | | 10/1976 | Velazquez | |
| 4,022,453 A | | 5/1977 | Durgan | |
| 4,780,941 A | | 11/1988 | Tucker | |
| 5,042,128 A | | 8/1991 | Barbour | |
| 5,241,734 A | | 9/1993 | Brackett et al. | |
| 5,339,515 A | | 8/1994 | Brackett et al. | |
| 5,371,932 A | | 12/1994 | Bryan et al. | |
| 5,689,870 A | | 11/1997 | Robey | |
| 5,950,293 A | | 9/1999 | Hamilton et al. | |

* cited by examiner

*Primary Examiner*—Robert C. Watson
(74) *Attorney, Agent, or Firm*—Kammer Browning PLLC

(57) ABSTRACT

A tool for the removal and replacement of valve springs on the cylinder head of an internal combustion engine while the cylinder head is either mounted to the engine block within the vehicle or is positioned on a work bench apart from the engine. The tool comprises a bracket component that is mounted by a number of bolts to the cylinder head to be worked on. The bracket includes a number of upright threaded bolts each associated with an adjacent upright guide. A pressure plate is progressively positioned on each set of the upright bolts and upright guides. Beneath the pressure plate are positioned two (or more) valve guides that engage the outer upper perimeter of two or more valve springs. A nut is threaded on to the upright bolt in a manner that forces the pressure plate and the valve guides downward onto the valve springs. Compression of the springs releases the split rings or collars that hold the valve springs to the valve stems. The end of the valve stems that incorporate the split ring attachment mechanisms are allowed to move upward into the valve guides while the perimeter of the spring is compressed. In this manner the split ring can be removed and the springs released upon removal of the nut from the threaded upright bolt. The pressure plate may then be moved to the next upright bolt on the bracket to effect removal of the adjacent set of valve springs.

5 Claims, 3 Drawing Sheets

TOOL FOR FACILITATING THE REMOVAL AND REPLACEMENT OF ENGINE VALVE STEM SPRINGS AND SEALS

BACKGROUND OF THE INVENTION

1. Field of the Invention

The present invention relates generally to automotive engines and tools for the repair and replacement of engines and engine parts. The present invention relates more specifically to a tool that facilitates the removal and replacement of valve springs on an internal combustion engine as may be required for the replacement of valve seals on the engine.

2. Description of the Related Art

Many components on internal combustion engines for automobiles wear out over time and must be replaced. Among these components are the valve seals positioned on the engine cylinder heads. The typical cylinder valve component comprises an elongated shaft or stem with a valve head that rests in a valve seat or seal thereby closing an intake or exhaust port from the cylinder. The typical valve structure includes a strong spring that maintains the valve head tightly against the seat or seal unless a rotating cam forces the shaft downward and thus the valve head away from the seal. The valve spring is typically connected to the valve stem in a removable fashion at one end of the shaft.

In order to replace the valve seat or valve seal which wears out over time, it is necessary to compress the valve spring away from its point of attachment to the valve stem. In this manner the attachment mechanism (typically a split ring or collar) can be removed and the spring released. One of the most difficult and dangerous activities in the repair and replacement process for automotive mechanics is the compression of these strong valve springs in order to carry out their removal and the replacement of the valve seals. It is not uncommon for the manual compression of the spring to accidentally release and injure the mechanic in the process. It is well known to use lever based mechanisms for compressing the spring with one hand while attempting to remove the split ring or collar from the valve shaft with the other hand. If the lever slips, the spring and/or the split ring components might easily be directed with some force at the mechanic carrying out the operation.

There are instances in the repair of automotive engines where the removal of valve springs can be carried out with the cylinder head in place on the engine block. There are other circumstances where it is preferable to conduct repairs on the cylinder head on a work bench separate from the engine block.

Various efforts have been made in the past to provide tools to facilitate the removal of valve springs from the cylinder heads of automotive engines. Some of these efforts in the past attempt to provide tools for removal of the valve springs while the cylinder heads are in place on the engine while others rely on first removing the cylinder heads from the engine and carrying out their disassembly on a work bench or the like. Examples of each of these approaches can be found in the following patent disclosures.

U.S. Pat. No. 3,977,064 issued to Mote et al. on Aug. 31, 1976 entitled SITU VALVE SPRING COMPRESSION TOOL describes a valve spring compressor tool intended specifically for use in conjunction with cylinder heads that incorporate heavy duty double valve springs. The tool includes a support bridge that is bolted to the rocker housing across the valves to be compressed. A shaft is threaded into the cross arm and is aligned so that rotation causes it to exert a compressive force down on the springs and retains them in a compressed position for work on the valve assembly.

U.S. Pat. No. 3,979,811 issued to Kammeraad on Sep. 14, 1976 entitled OVERHEAD CAMSHAFT AND VALVE TRAIN INSERTION AND REMOVAL TOOLS describes a tool intended for use in conjunction with overhead camshaft assemblies. The tool includes a longitudinal base for attachment to the cylinder head which positions a number of rocker members that project under the camshaft to a position over the valve springs. Each rocker member retains a threaded screw that when turned pivots the rocker so as to compress the valve spring. This permits the removal of the camshaft or other work to be carried out on the valve assembly.

U.S. Pat. No. 3,984,909 issued to Velazquez on Oct. 12, 1976 entitled VALVE STEM SEAL CHANGING TOOL is directed specifically to a tool that facilitates the removal and replacement of valve stem seals. The best view of the overall tool can be seen in FIG. 4 of the patent wherein a threaded rod with a turning handle may be positioned immediately over the valve spring for compression. A sliding guide rod is positioned on the cylinder head to facilitate the individual placement of the spring compressor over the valve to be worked on. The tool contemplates work on only a single valve at a time and the sliding of the tool across the cylinder head as work progresses. An additional tool component may be inserted through a spark plug hole in the cylinder head to help retain the valve in position after the valve spring has been released.

U.S. Pat. No. 4,022,453 issued to Durgan on May 10, 1977 entitled CLAMP FOR ENGINE HEAD SERVICE TEST BENCH describes a service bench that includes a clamp designed to facilitate the compression of valve springs on an internal combustion engine cylinder head. Other functions of the clamp are anticipated, but it is primarily designed to be positioned across a pair of valves with a bridge. A threaded rod pushes on the bridge between the valves in a manner that compresses the springs for the two valves and facilitates their removal.

U.S. Pat. No. 4,780,941 issued to Tucker on Nov. 1, 1988 entitled QUICK MOUNT HAND VALVE SPRING COMPRESSOR describes yet another valve spring compression tool intended to operate in conjunction with a single valve spring at a time. The tool includes a device that is attached to a threaded rocker stud on the cylinder head and positions a metal yoke over the individual valve spring. It appears that the unique feature of this device is the manner in which it may be removably attached to the threaded stud on the cylinder head and hand cranked so as to compress the valve spring.

U.S. Pat. No. 5,042,128 issued to Barbour on Aug. 27, 1991 entitled TOOL FOR REMOVING VALVE SPRING RETAINER OF A VALVE'S ASSEMBLY describes yet another rocker plate type tool that is positioned in place of the valve rocker over the valve spring assembly. A threaded rod is positioned on a non-threaded seat within a push rod bore of the engine cylinder head. This seat causes the threaded rod to push up on the rocker plate when turned so as to compress the valve spring on the opposite end of the rocker plate. The patent appears to only address the placement of the tool in conjunction with a single valve spring at a time.

U.S. Pat. No. 5,241,734 issued to Brackett on Sep. 7, 1993 entitled APPARATUS AND METHOD FOR REMOVING AND INSTALLING VALVE-SPRING RETAINER ASSEMBLIES describes a tool that employs an existing spark plug opening for the purpose of mounting to the engine cylinder head. Like many of the previous patents, it relies on a single lever positioned on the cylinder head in a manner such that the forced movement of one end of the lever causes the compression of the valve spring on the opposite end of the lever. An alternative embodiment in this patent is shown in FIG. 4 wherein a gang of four valve springs may be compressed through the use of an x-shaped compression tool secured to the cylinder head at the center of the tool. A similar assembly is contemplated for two side-by-side positioned valve springs as shown in FIG. 5.

U.S. Pat. No. 5,339,515 issued to Brackett et al. on Aug. 23, 1994 is a continuation-in-part of the earlier Brackett patent and "improves" upon the device by providing a handle for depressing the lever described above. As shown in FIGS. 6 and 7 the lever handle is intended to speed up the process of compressing the spring versus a threaded compression screw. It would appear that there are some safety concerns with the hand operated mechanism described in this patent. In addition, there is no indication that multiple valve springs are worked on at the same time.

U.S. Pat. No. 5,371,932 issued to Bryan et al. on Dec. 13, 1994 entitled MULTIPLE VALVE SPRING COMPRESSOR describes a bench device consisting of a rectangular base of sufficient size to support an entire cylinder head assembly. Incorporated into the tool is a longitudinal plate best seen in FIG. 2 having a long open slit in its center. The open slit is sized and positioned to fit over the valve stems, while the balance of the plate is positioned to compress the valve springs. Operation of the tool is by means of an expandable device such as a hydraulic cylinder that presses down on the plate. Various orientations of the cylinder head are provided for in the assembly.

U.S. Pat. No. 5,689,870 issued to Robey on Nov. 25, 1997 entitled VALVE SPRING COMPRESSION TOOL describes a fairly simple device intended to be used in conjunction with a standard ratchet wrench. The tool includes a rocker plate that is positioned in place of the valve rocker and is forced downward by the progressive threading of a special socket onto the rocker arm stud. Here again, there is no indication that more than a single valve can be worked on at a time.

U.S. Pat. No. 5,950,293 issued to Hamilton et al on Sep. 14, 1999 also describes a bench tool device for working on an engine cylinder head once it has been removed from the engine. A pneumatically operated valve spring clamp may be moved from side-to-side across the cylinder head so that its compression shaft may be appropriately positioned above each valve spring. Here again a specialized clamp or bracket for holding the cylinder head permits a rotation around a longitudinal axis of the cylinder head in order to appropriately position the valve springs for compression.

Each of the above efforts in the past to provide tools to facilitate the removal of valve springs suffer from either excessive complexity or difficulty of use. It would be desirable to have a simple tool mechanism that would facilitate the removal and replacement of valve springs on a cylinder head both in place on an engine within a vehicle or separated from the engine on a work bench. It would be desirable for such a tool to be simple, inexpensive, easy to apply and safe in its operation.

SUMMARY OF THE INVENTION

It is therefore an object of the present invention to provide a tool to facilitate the removal and replacement of valve springs on an internal combustion engine.

It is a further object of the present invention to provide a tool for the removal and replacement of valve springs from the cylinder head of an internal combustion engine while the cylinder head remains mounted to the engine block within the vehicle.

It is a further object of the present invention to provide a tool for the removal and replacement of valve springs from the cylinder head of an internal combustion engine when the cylinder head is removed from the engine such as during a rebuilding process on a work bench.

It is a further object of the present invention to provide a tool for the removal and replacement of valve springs on an engine in a manner that is easy to apply, simple to operate, and safe in its operation.

It is a further object of the present invention to provide a tool to assist a mechanic in the removal and replacement of valve springs on an engine for the purpose of removing and replacing valve seals and the like associated with the engine.

It is a further object of the present invention to provide a tool for the removal and replacement of valve springs on an engine that requires only minimal points of attachment to the engine in order to be utilized and further, that the points of attachment be existing cylinder head bolt holes.

It is a further object of the present invention to provide a tool for the removal and replacement of valve springs on an engine in a manner that allows the mechanic to move from one set of valve springs to the next without time consuming repositioning of the tool on the engine cylinder head.

In fulfillment of these and other objectives, the present invention provides a tool for the removal and replacement of valve springs on the cylinder head of an internal combustion engine while the cylinder head is either mounted to the engine block within the vehicle or is positioned on a work bench apart from the engine. The tool comprises a bracket component that is mounted by a number of bolts to the cylinder head to be worked on. The bracket includes a number of upright threaded bolts each associated with an adjacent upright guide. A pressure plate is progressively positioned on each set of the upright bolts and upright guides. Beneath the pressure plate are positioned two (or more) valve guides that engage the outer upper perimeter of two or more valve springs. A nut is threaded on to the upright bolt in a manner that forces the pressure plate and the valve guides downward onto the valve springs. Compression of the springs releases the split rings or collars that hold the valve springs to the valve stems. The end of the valve stems that incorporate the split ring attachment mechanisms are allowed to move upward into the valve guides while the perimeter of the spring is compressed. In this manner the split ring can be removed and the springs released upon removal of the nut from the threaded upright bolt. The pressure plate may then be moved to the next upright bolt on the bracket to effect removal of the adjacent set of valve springs.

DETAILED DESCRIPTION OF THE PREFERRED EMBODIMENT

Figure 1:
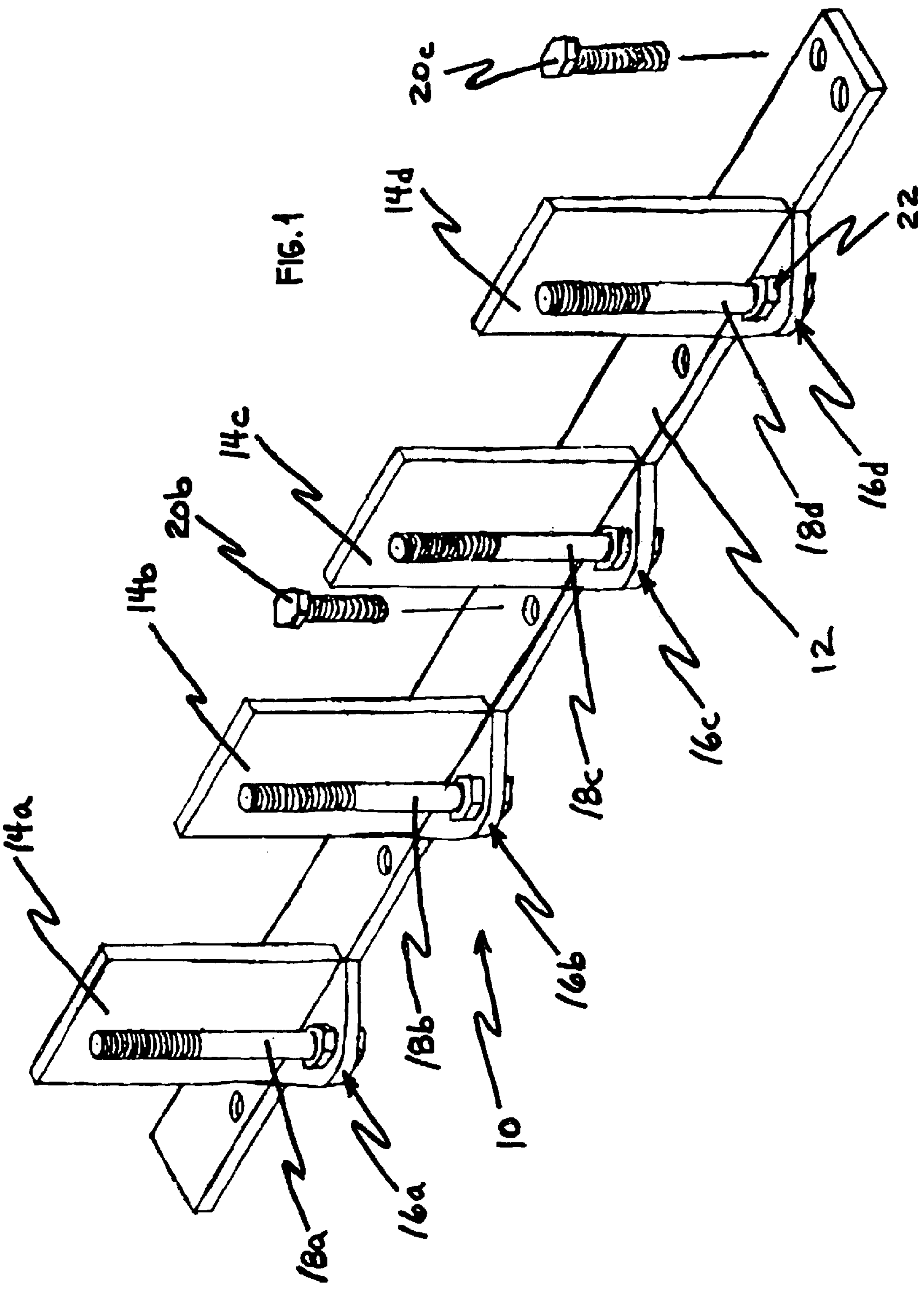
FIG. 1 is a perspective view of the primary bracket component of the tool of the present invention showing two of three attachment bolts.

Reference is made first to FIG. 1 for a description of the primary bracket component of the tool of the present invention. FIG. 1 shows in a perspective view the structure and arrangement of the various parts of bracket member 10. Longitudinal attachment plate 12 of bracket member 10 is bolted to an engine cylinder head (not shown) by means of bolts 20*a* through 20*c*. Appropriate apertures are positioned on attachment plate 12 to match with standard cylinder head bolt holes known in the industry. The structure shown in FIG. 1 is that designed for attachment to one cylinder head of a Ford 4.6 liter V-8 engine. Alternative applications would merit modifications to the length of attachment plate 12 and the positioning of the bolt apertures.

Aligned along one edge of attachment plate 12 and rigidly attached thereto are a plurality of upright bolts 18*a* through 18*d* and a plurality of upright guides 14*a* through 14*d*. Each upright bolt 18*a* through 18*d* is positioned on an extension 16*a* through 16*d* off of attachment plate 12. Upright bolts may be welded to extension 16*a* through 16*d* or may be bolted thereto by means of threaded nuts 22 as shown.

Figure 2:
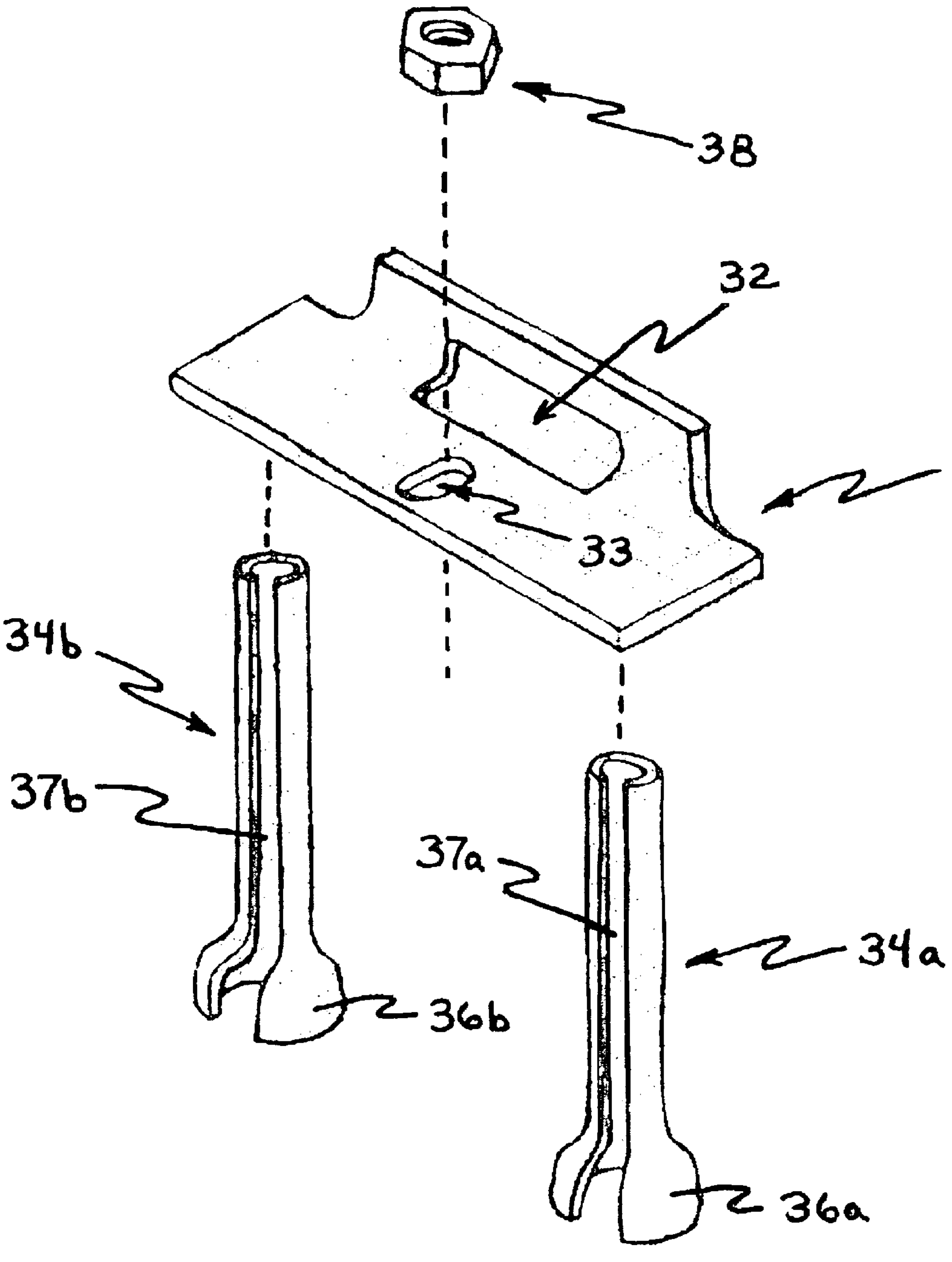
FIG. 2 is an exploded perspective view of the guide and pressure plate components of the tool of the present invention.

Reference is now made to FIG. 2 for a description of the balance of the components of the tool of the present invention. As will be described in more detail below with respect to FIG. 3, the components disclosed in FIG. 2 work in conjunction with the bracket component disclosed in FIG. 1 to effect the compression of the valve springs on the engine cylinder head. In FIG. 2, pressure plate 30 is shown positioned in association with valve guides 34*a* and 34*b*. In addition, nut 38 is shown as it would be positioned above pressure plate 30 upon application of the same to the bracket shown in FIG. 1.

Pressure plate 30 comprises a rigid metal component having an upright bolt aperture 33 and a guide aperture 32. The manner in which these apertures cooperate with the bracket shown in FIG. 1 is described in detail below.

Valve guides 34*a* and 34*b* are positioned below pressure plate 30 and are intended to rest upon the upper perimeters of the valve springs associated with the engine cylinder head. In FIG. 2 two such valve guides are shown. Alternative embodiments of the present invention anticipate additional valve guides (and a larger pressure plate) to effect the compression of more than two springs at a time. The design shown in FIG. 2 is intended to be used for the compression of two valve springs immediately adjacent each other on a cylinder head.

Valve guides 34*a* and 34*b* comprise flared feet 36*a* and 36*b* and split tubular extensions 37*a* and 37*b*. Flared feet 26*a* and 36*b* are sized and structured to engage the upper perimeter surface of the valve springs. In this manner a force directed down by the valve guides 34*a* and 34*b* compresses the springs without engaging or encumbering the release of the valve stem position near the center of the valve spring. The valve stems in each case are free to move upward into valve guides 34*a* and 34*b* and to be accessible through the slots in slotted tubular extensions 37*a* and 37*b*. In this manner the mechanic can access and remove the split rings or split collars that retain the valve the spring onto the valve stem. Further detail of this process is described below.

Each of the components shown and described with respect to FIG. 1 and FIG. 2 are constructed of steel stock and/or steel bolts and nuts. The guide components and the upright bolts shown in FIG. 1 may be welded or formed from the steel stock associated with the attachment plate. Given the requisite forces that will be experienced by the tool in compressing the valve springs, those skilled in the art will recognize the necessary rigidity and structural integrity required of the tool for selection of the appropriate thickness of stock and size of materials.

Figure 3:
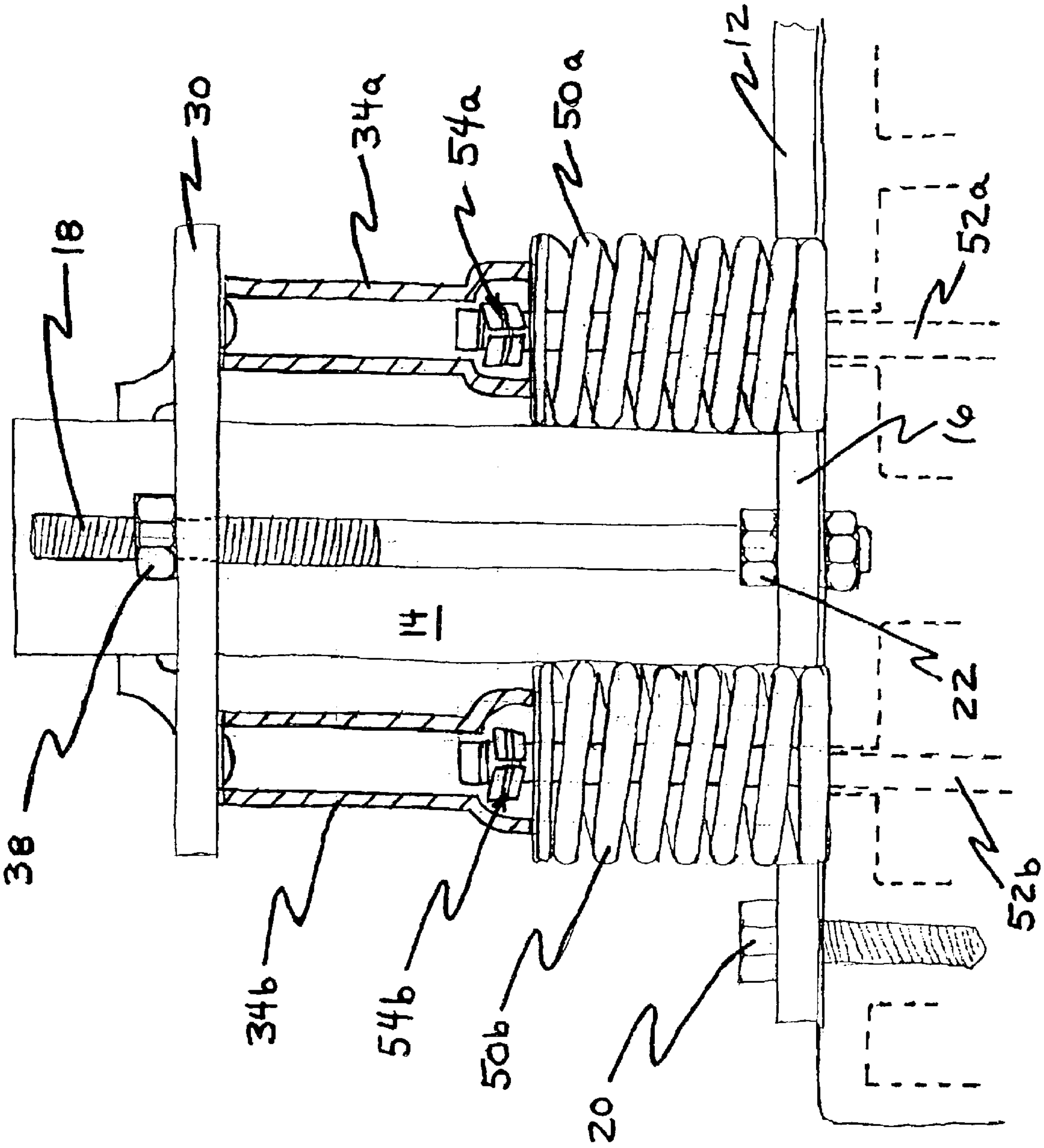
FIG. 3 is a detailed side view of the guide and pressure plate components of the present invention positioned as during use on one upright member of the bracket component of the invention, all as positioned on a typical engine valve spring assembly.

Reference is now made to FIG. 3 for a detailed description of both the manner in which the tool of the present invention is attached to the cylinder head for use and the manner in which the compression of adjacent valve springs is carried out. In FIG. 3 attachment plate 12 is shown bolted to a cylinder head (shown in dashed line detail) by way of bolt 20 threaded into an existing cylinder head bolt hole. Other bolts (not shown) as described above with respect to FIG. 1 are utilized to rigidly attach plate 12 to the cylinder head.

The arrangement of the bracket component is such that placement of attachment plate 12 on the cylinder head appropriately positions each of the upright bolts 18 and the upright guide 14 adjacent a pair (or more) of valve springs 50*a* and 50*b*. Valve guides 34*a* and 34*b* are then positioned as indicated on the upper perimeter of valve springs 50*a* and 50*b*. Typically there is a valve washer either placed on top of valve spring 50*a* or 50*b* or integrally formed therewith. Valve guides 34*a* and 34*b* therefore would typically rest upon the flat washer surface on the perimeter thereof. Valve stems 52*a* and 52*b* are thereby free to move upward into valve guides 34*a* and 34*b* when springs 50*a* and 50*b* are compressed. As indicated in more detail below, this compression and the movement of valve stems 52*a* and 52*b* upward into valve guides 34*a* and 34*b* serves to release split rings or split collars 54*a* and 54*b* such that the valve stems are released.

Once valve guides 34*a* and 34*b* have been positioned, pressure plate 30 is positioned on top thereof in association with upright bolt 18 and upright guide 14. Nut 38 is then threaded onto upright bolt 18 in a manner that directs pressure plate 30 downward on top of valve guides 34*a* and 34*b*. Continuous threading of bolt 38 forces pressure plate 30 downward further in a manner that compresses valve springs 50*a* and 50*b*. As indicated above, the perimeter force down on valve springs 50*a* and 50*b* allows for the release of split rings or split collars 54*a* and 54*b* from engagement with the valve stems 52*a* and 52*b*. The mechanic is free to access and remove the released split ring or collar. In this manner valve springs 50*a* and 50*b* may be removed from the assembly once nut 38, pressure plate 30 and valve guides 34*a* and 34*b* are released from upright bolt 18.

Once the above operation has been carried out with respect to a first pair of valve springs on the cylinder head, the same pressure plate 30, nut 38 and valve guides 34*a* and 34*b* may be moved to the next adjacent set of valve springs for similar compression and removal. Alternately, the present tool might incorporate more than one set of components shown in FIG. 2 (pressure plate, nut and pair of valve guides). In this manner, multiple sets of valve springs can be operated on at the same time.

Once objective of the present invention, however, is to permit the use of a tool that is simple to operate. In fulfillment of this objective the set of components shown in FIG. 2 is readily moved from one set of valve springs to the next. Very little time and effort is required to proceed down a line of valves on a cylinder head. This makes it generally unnecessary to utilize more than one set of components shown in FIG. 2.

It is anticipated that those skilled in the art will recognize modifications and extensions of the present invention described above that fall within the scope of the invention. It is recognized that a variety of engine types with four to eight or more cylinders would require a variety of tool structures. The modifications to the tool necessary to make the tool applicable to each of the different engine structures should be apparent to those skilled in the art. The example shown in the drawing figures is generally structured for one side of a V-8 engine (or a single in-line 4-cylinder engine) such as is quite common for a number of U.S. manufactured vehicles. Likewise, specific placement of the upright bolts and guides described is related directly to the type of engine being worked on. Modifications to the spacing between the guides, the bolt attachment points, etc. would be clear to those skilled in the art. Other modifications and adaptations of the present invention will likewise be apparent to those skilled in the art.

I claim:

1. A tool for the removal and replacement of valve springs from valve stems on a cylinder head of an internal combustion engine while the cylinder head is either mounted to an engine block within the vehicle or is positioned on a work bench apart from the engine block, the tool comprising:

a bracket assembly mountable to the cylinder head to be worked on, the bracket assembly comprising a plurality of threaded upright bolts extending away from the cylinder head and each of the threaded bolts associated with an adjacent upright guide;

a plurality of pressure plates positioned on each of the upright bolts and upright guides and each movably secured on an upright bolt with a threaded nut; and a plurality of valve guides positioned so as to engage an outer upper perimeter of a valve spring on the cylinder head and simultaneously engage the pressure plates positioned on the upright bolts;

wherein rotation of each threaded nut on the upright bolts directs the pressure plates against the valve guides, which in turn are directed against the valve springs on the cylinder head in a manner that compresses the springs and permits the removal of the valve springs from the valve stems.

2. The tool of claim 1 wherein the bracket assembly is mounted to the cylinder head with a plurality of threaded head bolts.

3. The tool of claim 2 wherein said threaded head bolts are positioned to be aligned with existing threaded apertures on the cylinder head.

4. The tool of claim 1 wherein each of said plurality of pressure plates is associated with two of the valve guides and operates to compress two adjacent valve springs on the cylinder head.

5. A tool for the removal and replacement of valve springs from valve stems on a cylinder head of an internal combustion engine while the cylinder head is either mounted to an engine block within the vehicle or is positioned on a work bench apart from the engine block, the tool comprising:

a bracket assembly mountable to the cylinder head to be worked on with a plurality of threaded head bolts positioned to be aligned with existing threaded apertures on the cylinder head, the bracket assembly comprising a plurality of threaded upright bolts extending away from the cylinder head and each of the threaded bolts associated with an adjacent upright guide;

a plurality of pressure plates positioned on each of the upright bolts and upright guides and each movably secured on an upright bolt with a threaded nut; and a plurality of valve guide pairs positioned so as to engage an outer upper perimeter of a pair of adjacent valve springs on the cylinder head and simultaneously engage the pressure plates positioned on the upright bolts;

wherein rotation of each threaded nut on the upright bolts directs the pressure plates against the pair of valve guides, which in turn are directed against the pair of valve springs on the cylinder head in a manner that compresses the springs and permits the removal of the valve springs from the valve stems.

* * * * *